US009436247B2

(12) United States Patent
Chu et al.

(10) Patent No.: US 9,436,247 B2
(45) Date of Patent: Sep. 6, 2016

(54) RACK SERVER SYSTEM

(71) Applicants: INVENTEC (PUDONG) TECHNOLOGY CORPORATION, Shanghai (CN); INVENTEC CORPORATION, Taipei (TW)

(72) Inventors: Fang-Jie Chu, Shanghai (CN); Cheng Wang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 144 days.

(21) Appl. No.: 14/579,030

(22) Filed: Dec. 22, 2014

(65) Prior Publication Data

US 2016/0091961 A1 Mar. 31, 2016

(30) Foreign Application Priority Data

Sep. 30, 2014 (CN) .......................... 2014 1 0521916

(51) Int. Cl.
*G06F 1/26* (2006.01)
*G06F 1/32* (2006.01)
*G05B 15/02* (2006.01)

(52) U.S. Cl.
CPC .................. *G06F 1/26* (2013.01); *G05B 15/02* (2013.01); *G06F 1/3209* (2013.01); *G06F 1/3296* (2013.01)

(58) Field of Classification Search
CPC ....... G06F 1/26; G06F 1/3209; G06F 1/3296
USPC ...................................................... 713/300
See application file for complete search history.

(56) References Cited

U.S. PATENT DOCUMENTS

| 8,080,900 B2* | 12/2011 | Corhodzic | G06F 1/263 307/64 |
| 8,972,752 B2* | 3/2015 | Bailey | G06F 1/30 713/300 |
| 9,037,879 B2* | 5/2015 | Jau | G06F 1/305 713/300 |
| 9,301,420 B2* | 3/2016 | Bailey | H05K 7/1492 |
| 2008/0212273 A1* | 9/2008 | Bechtolsheim | H05K 7/1487 361/679.33 |
| 2010/0042852 A1* | 2/2010 | Yin | G06F 1/26 713/300 |
| 2012/0134090 A1* | 5/2012 | Peng | G06F 1/189 361/679.31 |
| 2012/0327591 A1* | 12/2012 | Jau | H05K 7/1492 361/679.48 |
| 2014/0215241 A1* | 7/2014 | Yoon | G06F 1/324 713/322 |
| 2016/0116975 A1* | 4/2016 | Takagi | G06F 1/263 713/320 |

* cited by examiner

Primary Examiner — Chun Cao
(74) Attorney, Agent, or Firm — Huffman Law Group, PC

(57) ABSTRACT

A rack server system is provided. When a power source supplied to the rack server system is normal, a part of the power source is supplied to a management module in the rack server system and the other part of the power source charges the energy storage component. When the power source supplied to the rack server system is abnormal, the power source will be blocked and not be supplied to the management module, thereby preventing the rack server system from operating abnormally. In stead of the power source, the electricity stored in the energy storage component is supplied to the management module. Herein, the management module also records this situation as the state information about the rack server system whereby the rack server system can be managed according to the state information.

12 Claims, 4 Drawing Sheets

RACK SERVER SYSTEM

CROSS-REFERENCE TO RELATED APPLICATIONS

This non-provisional application claims priority under 35 U.S.C. § 119(a) on Patent Application No(s). 201410521916.1 filed in China on Sep. 30, 2014, the entire contents of which are hereby incorporated by reference.

BACKGROUND OF THE INVENTION

1. Technical Field of the Invention

The disclosure is related to a rack server system, more particularly to a rack server system with an energy storage component to prevent supplying the power source from being unstable.

2. Description of the Related Art

Rack server systems are prevalently applied to large companies or cloud systems. However, the rack server system requires a great deal of electricity and, because of the unstable power supply, easily crashes. During the crash, much data including the system configuration may be lost. Therefore, it'd be better to prevent the rack server from such a situation.

SUMMARY OF THE INVENTION

According to one or more embodiments, the disclosure provides a rack server system. In one embodiment, the rack server system includes a plurality of server nodes, a power supplying module, and a rack management module. The power supplying module outputs a first power source. The rack management module includes a management module, a detection module, an isolation module, an energy storage component, a charging module, and a discharging module. The detection module is coupled with the power supplying module and outputs a detection signal according to the first power source. The isolation module is coupled with the power supplying module and the detection module and receives the first power source and outputs a second power source to the management module according to the detection signal. The energy storage component stores electricity. The charging module is coupled with the energy storage component, the isolation module, and the detection module, receives the second power source, and outputs a third power source according to the detection signal to charge the energy storage component. The discharging module is coupled with the energy storage component, the detection module, and the management module. According to the detection signal, the discharging module transfers the electricity released from the energy storage component to provide a fifth power source to the management module. When the power supplying module operates normally, the detection module outputs the detection signal at a first voltage level indicating that the first power source is normal, the isolation module outputs the second power source according to the detection signal, the charging module outputs a third power source according to the detection signal to charge the energy storage component, and the discharging module is disabled according to the detection signal such that the energy storage component stops outputting the fifth power source through the disabled discharging module. Otherwise, when the power supplying module operates abnormally, the detection module outputs the detection signal at a second voltage level indicating that the first power source is abnormal, the isolation module stops outputting the second power source according to the detection signal, the charging module stops outputting the third power source according to the detection signal to stop charging the energy storage component, and the discharging module is enabled according to the detection signal such that the energy storage component discharges through the discharging module to provide the fifth power source. On the other hand, when the power supplying module operates normally, the management module receives the second power source and operates normally, and when the power supplying module operates abnormally, the management module receives the fifth power source and operates normally.

In one embodiment of the rack server system, the rack server system further includes a communication module coupled with the management module and allowing the management module to perform external communication.

In one embodiment of the rack server system, when the power supplying module operates abnormally, the management module records state information about the rack management module and sends it out through the communication module in order to manage the rack server system during a time period that the communication module and the management module operate normally according to the fifth power source.

In one embodiment of the rack server system, the detection module includes a main voltage generator, a reference voltage generator, and a determination unit. The main voltage generator is coupled with the power supplying module and outputs the main voltage according to the first power source. The reference voltage generator is coupled with the power supplying module and outputs the reference voltage according to the first power source. The determination unit is coupled with the main voltage generator and the reference voltage generator and compares the main voltage with the reference voltage to output the detection signal. When the main voltage is higher than the reference voltage, the detection signal is at a first voltage level, and when the main voltage is lower than the reference voltage, the detection signal is at a second voltage level.

In one embodiment of the rack server system, the first voltage level is a high logic level, and the second voltage level is a low logic level.

In one embodiment of the rack server system, the main voltage is obtained by dividing the first power source.

In one embodiment of the rack server system, the reference voltage generator includes a delay module and a voltage regulation source. The delay module receives the first power source and outputs a reference voltage. An input terminal of the voltage regulation source is coupled with a ground node of the rack server system. A variable reference source of the voltage regulation source is adjusted through a voltage division circuit. An output terminal of the voltage regulation source stabilizes the reference voltage outputted by the delay module.

In one embodiment of the rack server system, the determination unit includes a comparator, a resistor, and a first transistor module. A positive input terminal of the comparator receives a main voltage, a negative input terminal of the comparator receives the reference voltage, and an output terminal of the comparator outputs a voltage comparison signal. Two terminals of the resistor are connected to the positive input terminal of the comparator and the output terminal of the comparator respectively to form a positive feedback loop, thereby speeding up the change of the output of the comparator and reducing the signal vibration. The first transistor module receives the voltage comparison signal and performs a driving modulation process on the voltage comparison signal to output the detection signal.

In one embodiment of the rack server system, the isolation module includes a logic conversion module and a power source transistor module. The logic conversion module receives the detection signal and logically converts the detection signal into a logic conversion signal. The power source transistor module includes a first power source transistor and a second power source transistor. A gate terminal of the first power source transistor receives the logic conversion signal, and a drain terminal of the first power source transistor receives the first power source. A gate terminal of the second power source transistor receives the logic conversion signal, a drain terminal of the second power source transistor outputs the second power source, and a source terminal of the second power source transistor is coupled with a source terminal of the first power source transistor. When the power source transistor module is turned on according to the logic conversion signal, the power source transistor module receives the first power source to provide the second power source. Otherwise, when the power source transistor module is turned off according to the logic conversion signal, the power source transistor module does not receive the first power source to output the second power source.

In one embodiment of the rack server system, the charging module includes at least one voltage converter and at least one transistor switch. The at least one voltage converter generates a switch control signal according to the detection signal. Two terminals of the at least one transistor switch receive the second power source and the third power source respectively, and a gate terminal of the at least one transistor switch receives the switch control signal. The at least one transistor switch is turned on and off according to the switch control signal. When the at least one transistor switch is turned on, the at least one transistor switch receives the second power source to output the third power source, and when the at least one transistor switch is turned off, the at least one transistor switch does not receive the second power source to output the third power source.

In one embodiment of the rack server system, the discharging module includes a second transistor module and a power source transistor switch. The second transistor module receives the detection signal and performs a driving modulation process on the detection signal to output a transistor switch control signal. The power source transistor switch receives the transistor switch control signal, and the fourth power source, and the fifth power source and determine whether to receive the fourth power source to output the fifth power source according to the transistor switch control signal.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1A:
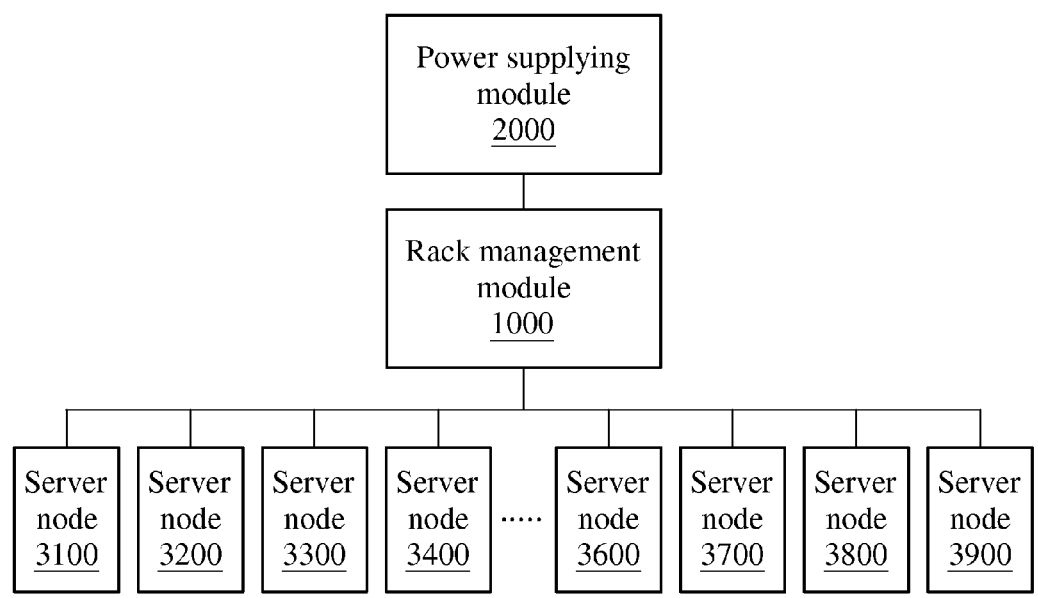
FIG. 1A illustrates an embodiment of a rack server system in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
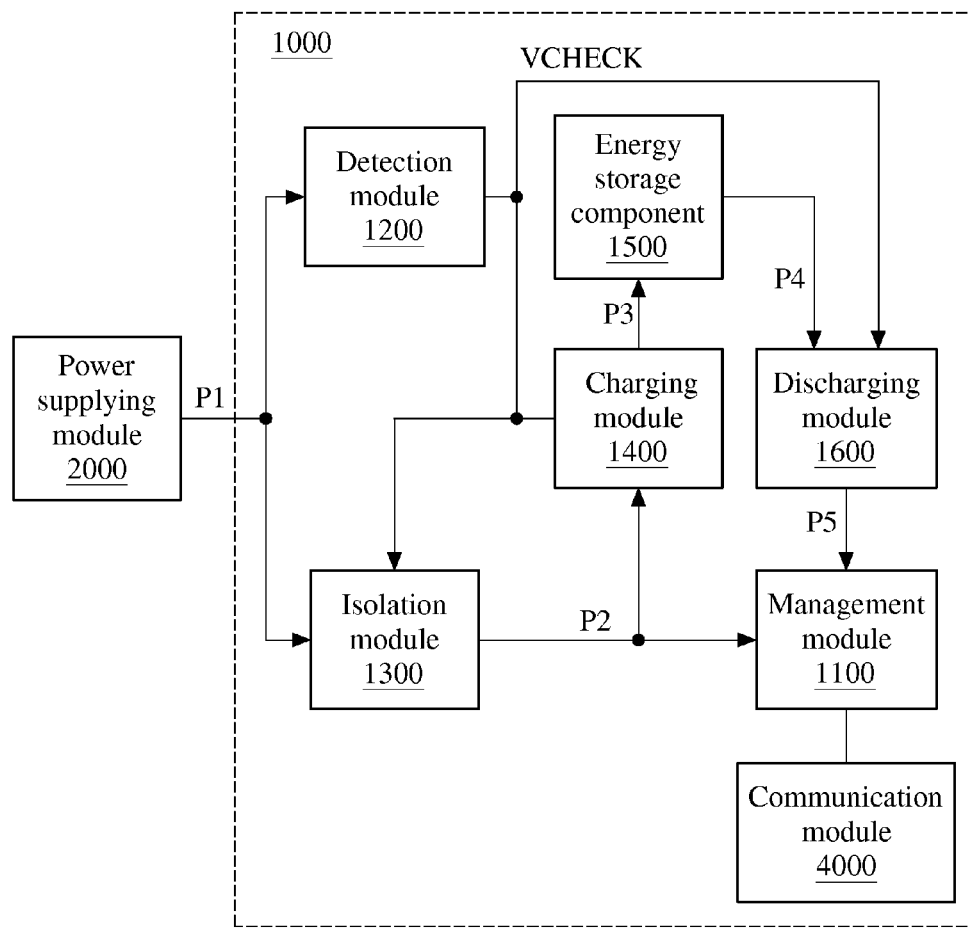
FIG. 1B is a block diagram of the rack management module in FIG. 1A.

Please refer to FIG. 1A and FIG. 1B. FIG. 1A illustrates an embodiment of a rack server system in the disclosure, and FIG. 1B is a block diagram of the rack management module in FIG. 1A. In FIG. 1A, a rack server system includes, for example, a rack management module 1000, a power supplying module 2000, and server nodes 3100 to 3900. The power supplying module 2000 outputs a first power source P1. In FIG. 1B, the rack management module 1000 includes, for example, a management module 1100, a detection module 1200, an isolation module 1300, a charging module 1400, an energy storage component 1500, and a discharging module 1600. The detection module 1200 is coupled with the power supplying module 2000. The individual operation and interaction of the above modules are illustrated as follows.

Figure 2:
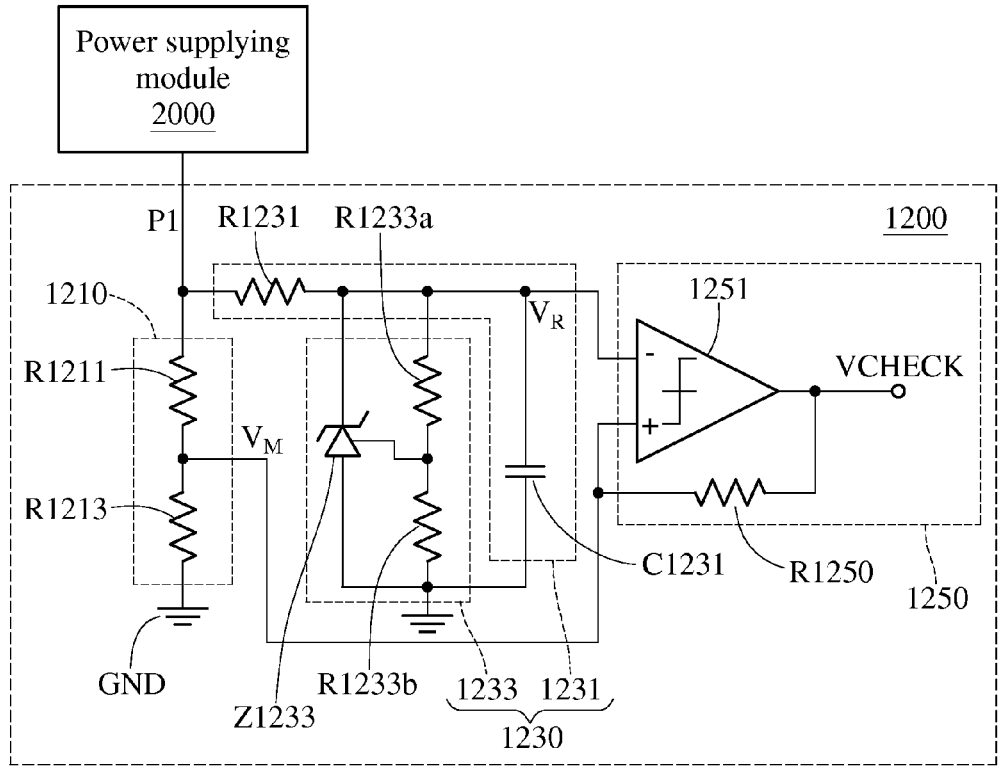
FIG. 2 is a schematic circuit diagram of an embodiment of the detection module in the disclosure.

The detection module 1200 outputs a detection signal VCHECK according to the first power source P1. The structure and operation of the detection module 1200 can be illustrated in FIG. 2. FIG. 2 is a schematic circuit diagram of an embodiment of the detection module in the disclosure. The detection module 1200 includes a main voltage generator 1210, a reference voltage generator 1230, and a determination unit 1250. The main voltage generator 1210 and the reference voltage generator 1230 are coupled with the power supplying module 2000, and the determination unit 1250 is coupled with the main voltage generator 1210 and the reference voltage generator 1230. The individual and interactive operation of the main voltage generator 1210, reference voltage generator 1230, and the determination unit 1250 are illustrated as follows.

The main voltage generator 1210 outputs a main voltage $V_M$ according to the first power source P1. Particularly, the main voltage generator 1210 includes two resistors R1211 and R1213 that are connected in series from the power supplying module 2000 to the ground node GND in the rack server system. The two resistors R1211 and R1213 divide the first power source P1 to obtain the main voltage $V_M$ that is directly proportional to the first power source P1. For example, when the resistors R1211 and R1213 have the same resistance value, the main voltage $V_M$ is equal to a half of the voltage level of the first power source P1.

The reference voltage generator 1230 generates a reference voltage $V_R$ according to the first power source P1. Specifically, the reference voltage generator 1230 includes a delay module 1231 and a voltage regulation source 1233. The delay module 1231 is coupled with the power supplying module 2000 and the ground node GND, and the voltage regulation source 1233 is coupled with an output terminal of the delay module 1231 and the ground node GND.

The delay module 1231 receives the first power source P1 and outputs the reference voltage $V_R$. Particularly, the delay module 1231 includes a resistor R1231 and a capacitor C1231. One terminal of the capacitor C1231 is coupled with the ground node GND, and the other terminal of the capacitor C1231 is coupled with one terminal of the resistor R1231. The other terminal of the resistor R1231 is coupled with the power supplying module 2000. Therefore, the change of the first power source P1 will not immediately affect the reference voltage $V_R$, thereby protecting the rack server system from the noises of the first power source P1.

An input terminal of the voltage regulation source 1233 is coupled with the ground node GND, the variable reference source of the voltage regulation source 1233 is divided by the resistors R1233a and R1233b in order to control a Zener diode Z1233, whereby the Zener diode Z1233 can control the variable reference source of the voltage regulation source 1233. The output terminal of the voltage regulation source 1233 is coupled to the cathode of the Zener diode Z1233 to receive the reference voltage $V_R$ from the delay module 1231, thereby stabilizing the reference voltage $V_R$.

The determination unit 1250 compares the main voltage $V_M$ with the reference voltage $V_R$ to output the detection signal VCHECK. The determination unit 1250 includes a comparator 1251 and a resistor R1250. A positive input terminal of the comparator 1251 receives the main voltage $V_M$, a negative input terminal of the comparator 1251 receives the reference voltage $V_R$, and an output terminal of the comparator 1251 outputs the detection signal VCHECK. Two terminals of the resistor R1250 are coupled with the positive input terminal and output terminal of the comparator 1251 respectively to form a positive feedback loop, thereby speeding up the change of the output of the comparator 1251 and reducing the signal vibration. Accordingly, when the main voltage $V_M$ is higher than the reference voltage $V_R$, the detection signal VCHECK is at a first voltage level (e.g. a high logic level), and when the main voltage $V_M$ is lower than the reference voltage $V_R$, the detection signal VCHECK is at a second voltage level (e.g. a low logic level). In some embodiments, the detection module 1200 can be replaced by a chip with the same or similar function.

Figure 3:
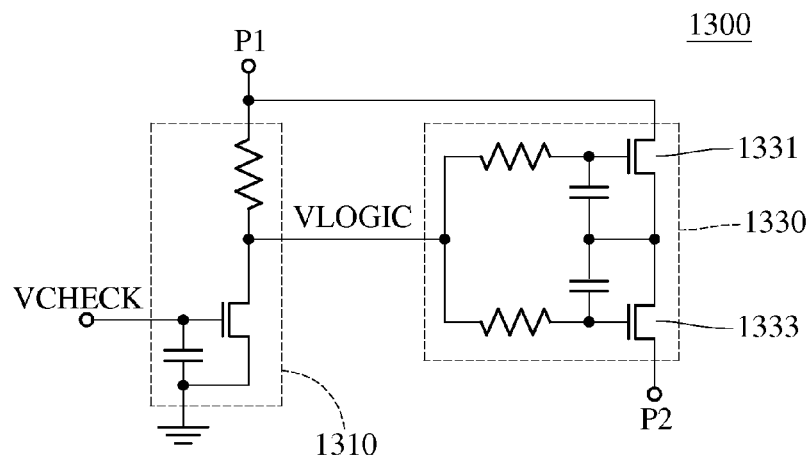
FIG. 3 is a schematic circuit diagram of an embodiment of the isolation module in the disclosure.

FIG. 3 is a schematic circuit diagram of an embodiment of the isolation module in the disclosure. The isolation module 1300 includes a logic conversion module 1310 and a power source transistor module 1330. The logic conversion module 1310 receives the detection signal VCHECK and logically converts the detection signal VCHECK into a logic conversion signal VLOGIC. The power source transistor module 1330 includes two power source transistors 1331 (as referred to the first power source transistor) and 1333 (as referred to the second power source transistor). The gate terminals of the power source transistors 1331 and 1333 receive the logic conversion signal VLOGIC such that the power source transistor module 1330 is turned on and off according to the logic conversion signal VLOGIC. The drain terminal of the power source transistor 1331 receives the first power source P1, and the source terminal of the power source transistor 1331 is coupled with the source terminal of the power source transistor 1333. The drain terminal of the power source transistor 1333 outputs the second power source P2. When the power source transistor module 1330 is turned on according to the logic conversion signal VLOGIC, the first power source P1 passes through the power source transistor module 1330 and becomes a second power source P2. Otherwise, when the power source transistor module 1330 is turned off according to the logic conversion signal VLOGIC, the first power source P1 does not pass through the power source transistor module 1330 to become the second power source P2.

Figure 4:
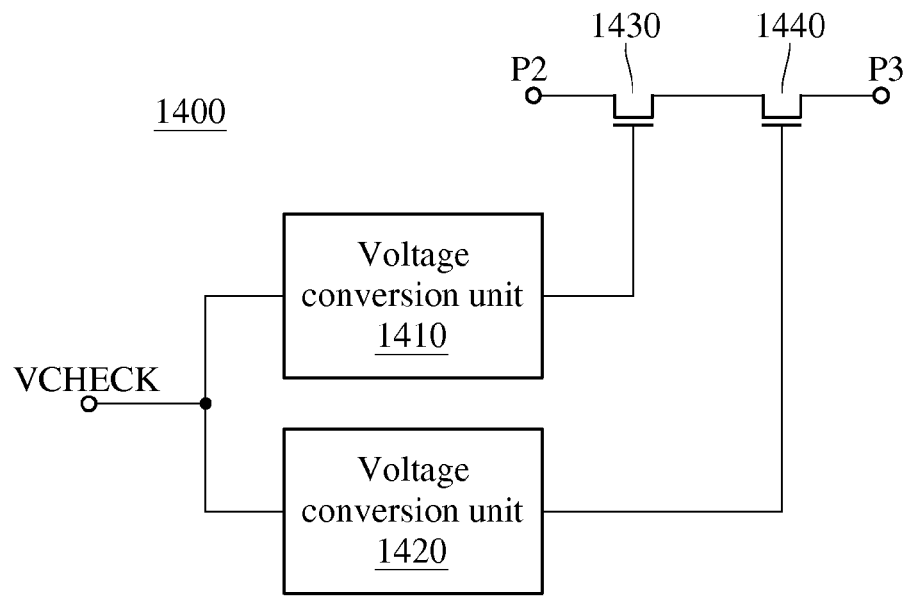
FIG. 4 is a schematic circuit diagram of an embodiment of the charging module in the disclosure.

FIG. 4 is a schematic circuit diagram of an embodiment of the charging module in the disclosure. The charging module 1400 includes two voltage converters 1410 and 1420 and two transistor switches 1430 and 1440. The voltage converters 1410 and 1420 generate switch control signals VS1 and VS2 according to the detection signal VCHECK respectively. The transistor switches 1430 and 1440 can be coupled in series as shown in FIG. 4. The transistor switch 1430 is coupled with the input terminal of the charging module 1400 in order to receive the second power source P2, and the transistor switch 1440 is coupled with the output terminal of the charging module 1400 in order to output the third power source P3. The gate terminals of the transistor switches 1430 and 1440 receive the switch control signals VS1 and VS2 from the voltage converters 1410 and 1420 respectively whereby the transistor switches 1430 and 1440 are turned on and off according to the switch control signals VS1 and VS2 respectively. When the transistor switches 1430 and 1440 are turned on, the second power source P2 passes through the transistor switches 1430 and 1440 to become the third power source P3. In contrast, when the transistor switch 1430 or 1440 is turned off, the second power source P2 will not pass through the transistor switches 1430 and 1440 to become the third power source P3. Although the charging module 1400 includes the two voltage converters 1410 and 1420 and the two transistor switches 1430 and 1440 in the embodiment, the charging module 1400 includes one or more than two single voltage converters and one or more than two single transistor switches in some embodiments.

For example, the energy storage component 1500 is a capacitor with a great capacitance value, or includes multiple capacitors that are coupled in parallel and have the same capacitance value or different capacitance values. When the charging module 1400 outputs the third power source P3, the energy storage component 1500 is charged by the third power source P3. Therefore, the energy storage component 1500 stores a certain quantity of charge for a certain voltage during the charging.

Figure 5:
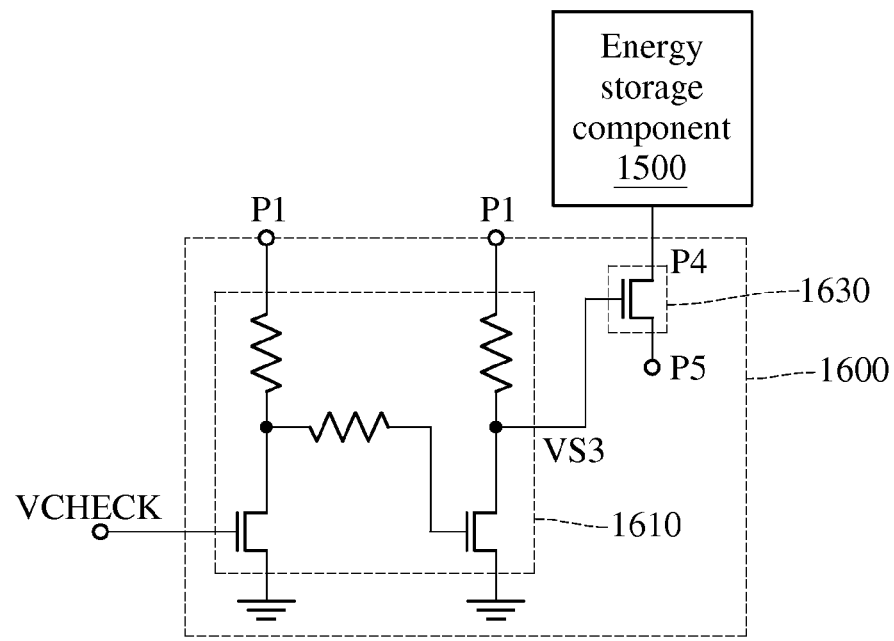
FIG. 5 is a schematic circuit diagram of an embodiment of the discharging module in the disclosure.

FIG. 5 is a schematic circuit diagram of an embodiment of the discharging module 1600 in the disclosure. The discharging module 1600 includes a second transistor module 1610 and a power source transistor switch 1630. The second transistor module 1610 receives the detection signal VCHECK and performs a driving modulation process on the detection signal VCHECK to output a transistor switch control signal VS3. The power source transistor switch 1630 is electrically connected to the energy storage component 1500 and the management module 1100 and is turned on and off according to the transistor switch control signal VS3. Therefore, the electricity as the fourth power source P4 is outputted from the energy storage component 1500 and passes through the power source transistor switch 1630 to become the fifth power source P5, and the fifth power source P5 is sent to the management module 1100.

In view of the above one or more embodiments, when the first power source P1 is normal because of the normal operation of the power supplying module 2000, the power source transistor module 1330 in the isolation module 1300 is turned on according to the detection signal VCHECK such that at least one part of the first power source P1 as the second power source P2 is outputted to the management module 1100. Simultaneously, the charging module 1400 charges the energy storage component 1500 by a part of the second power source P2 as the third power source P3 according to the detection signal VCHECK. Moreover, the discharging module 1600 cuts off the electric connection between the management module 1100 and the energy storage component 1500 according to the detection signal VCHECK. Accordingly, the management module 1100 operates under the supply of the second power source P2.

When the first power source P1 is abnormal because of the abnormal operation of the power supplying module 2000, the power source transistor module 1330 in the isolation module 1300 is tuned off according to the detection signal VCHECK such that the second power source P2 is not sent to the management module 1100. Meanwhile, the charging module 1400 stops the transmission of the second power source P2 according to the detection signal VCHECK such that the charging module 1400 stops charging the energy storage component 1500 by the third power source P3. The discharging module 1600 enables the electric connection between the management module 1100 and the energy storage component 1500 according to the detection signal VCHECK. Herein, the discharging module 1600 draws out the electricity from the energy storage component 1500 and outputs the fifth power source P5, so the management module 1100 operates normally and records state information of the rack management module 1000 during a time period.

In other embodiment, the rack management module 1000 can further include a communication module 4000. When the first power source P1 is abnormal because of the abnormal operation of the power supplying module 2000, the fifth power source P5 is further sent to the communication module, and the management module 1100 can send out the state information of the rack management module 1000 through the communication module whereby a user may manage the rack management module 1000 more easier.

As set forth above, the disclosure provides the above rack server system including the energy storage component, and when the power source supplied to the rack server system is normal, a part of the power source is supplied to the management module in the rack server system and the other part of the power source is used for charging the energy storage component. Otherwise, when the power source supplied to the rack server system is abnormal, the power source will be blocked and not be supplied to the management module, thereby preventing the rack server system from operating abnormally. In stead of the power source, the electricity stored in the energy storage component is supplied to the management module. Herein, the management module also records this situation as the state information about the rack server system whereby a user can manage the rack server system according to the state information.

What is claimed is:

1. A rack server system, comprising:
a plurality of server nodes;
a power supplying module configured to output a first power source; and
a rack management module, comprising:
a management module;
a detection module coupled with the power supplying module and configured to output a detection signal according to the first power source;
an isolation module coupled with the power supplying module and the detection module and configured to receive the first power source and according to the detection signal, determine whether to output a second power source to the management module;
an energy storage component configured to storing electricity;
a charging module coupled with the energy storage component, the isolation module, and the detection module and configured to receive the second power source and according to the detection signal, determine whether to output a third power source to charge the energy storage component; and
a discharging module coupled with the energy storage component, the detection module, and the management module and configured to receive a fourth power source from the energy storage component and according to the detection signal, transfer the electricity released from the energy storage component to provide a fifth power source to the management module;
wherein when the power supplying module operates normally, the detection module outputs the detection signal at a first voltage level indicating that the first power source is normal, the isolation module outputs the second power source according to the detection signal, the charging module outputs the third power source to charge the energy storage component according to the detection signal, and the discharging module does not provide the fifth power source according to the detection signal;
when the power supplying module operates abnormally, the detection module outputs the detection signal at a second voltage level indicating that the first power source is abnormal, the isolation module stops outputting the second power source according to the detection signal, the charging module stops outputting the third power source to charge the energy storage component according to the detection signal, and the discharging module provides the fifth power source according to the detection signal;
when the power supplying module operates normally, the management module receives the second power source and operates normally; and
when the power supplying module operates abnormally, the management module receives the fifth power source and operates normally.

2. The rack server system according to claim 1, further comprising a communication module coupled with the management module and configured to allow the management module to perform external communication.

3. The rack server system according to claim 2, wherein when the power supplying module operates abnormally, the energy storage component outputs the fifth power source through the discharging module such that during a time period that the communication module and the management module operates normally, the management module records state information about the rack management module and sends out the state information through the communication module in order to manage the rack server system.

4. The rack server system according to claim 1, wherein the detection module comprises:
a main voltage generator coupled with the power supplying module and configured to output a main voltage according to the first power source;
a reference voltage generator coupled with the power supplying module and configured to output a reference voltage according to the first power source; and
a determination unit coupled with the main voltage generator and the reference voltage generator and configured to compare the main voltage with the reference voltage to output the detection signal;
wherein when the main voltage is higher than the reference voltage, the detection signal is at the first voltage level; and when the main voltage is lower than the reference voltage, the detection signal is at the second voltage level.

5. The rack server system according to claim 4, wherein the first voltage level is a high logic level, and the second voltage level is a low logic level.

6. The rack server system according to claim 4, wherein the main voltage is obtained by dividing the first power source.

7. The rack server system according to claim 4, wherein the reference voltage generator comprises:
- a delay module for receiving the first power source and outputting the reference voltage; and
- a voltage regulation source whose input terminal is coupled with a ground node of the rack server system, whose variable reference source is adjusted through a voltage division circuit, and whose output terminal stabilizes the reference voltage outputted by the delay module.

8. The rack server system according to claim 4, wherein the determination unit comprises:
- a comparator having a positive input terminal for receiving the main voltage, a negative input terminal for receiving the reference voltage, and an output terminal for outputting a voltage comparison signal;
- a resistor having two terminals connected to the positive input terminal and output terminal of the comparator respectively to form a positive feedback loop to speed up the change of the output of the comparator and reduce signal vibration; and
- a first transistor module for receiving and performing a driving modulation process on the voltage comparison signal to output the detection signal.

9. The rack server system according to claim 1, wherein the isolation module comprises:
- a logic conversion module configured to receive the detection signal and logically convert the detection signal into a logic conversion signal; and
- a power source transistor module, comprising:
  - a first power source transistor having a gate terminal for receiving the logic conversion signal, a drain terminal for receiving the first power source, and a source terminal; and
  - a second power source transistor having a gate terminal for receiving the logic conversion signal, a drain terminal for outputting the second power source, and a source terminal coupled with the source terminal of the first power source transistor;
- wherein when the power source transistor module is turned on according to the logic conversion signal, the power source transistor module receives the first power source to output the second power source; and
- when the power source transistor module is turned off according to the logic conversion signal, the power source transistor module does not receive the first power source to output the second power source.

10. The rack server system according to claim 1, wherein the charging module comprises:
- at least one voltage converter configured to generate a switch control signal according to the detection signal; and
- at least one transistor switch having two terminals coupled with the second power source and the third power source respectively, having a gate terminal for receiving the switch control signal from the at least one voltage converter, and configured to turn on and off the at least one transistor switch according to the switch control signal;
- wherein when the at least one transistor switch is turned on, the at least one transistor switch receives the second power source to provide the third power source, and when the at least one transistor switch is turned off, the at least one transistor switch does not receive the second power source to provide the third power source.

11. The rack server system according to claim 1, wherein the discharging module comprises:
- a second transistor module configured to receive and perform a driving modulation process on the detection signal to output a transistor switch control signal; and
- a power source transistor switch configured to receive the transistor switch control signal, the fourth power source, and the fifth power source and determine whether to receive the fourth power source to output the fifth power source according to the transistor switch control signal.

12. The rack server system according to claim 1, wherein the first voltage level is a high logic level, and the second voltage level is a low logic level.

* * * * *